US012587294B2

(12) United States Patent
Mu

(10) Patent No.: US 12,587,294 B2
(45) Date of Patent: Mar. 24, 2026

(54) MODULATION AND CODING SCHEME (MCS) CONFIGURATION METHOD AND APPARATUS, AND COMMUNICATION DEVICE

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 427 days.

(21) Appl. No.: 18/252,299

(22) PCT Filed: Nov. 18, 2020

(86) PCT No.: PCT/CN2020/129861
§ 371 (c)(1),
(2) Date: May 9, 2023

(87) PCT Pub. No.: WO2022/104605
PCT Pub. Date: May 27, 2022

(65) Prior Publication Data
US 2024/0008091 A1 Jan. 4, 2024

(51) Int. Cl.
*H04B 17/318* (2015.01)
*H04L 1/00* (2006.01)
*H04W 74/0833* (2024.01)

(52) U.S. Cl.
CPC ......... *H04B 17/328* (2023.05); *H04L 1/0003* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2015/0200746 A1* | 7/2015 | Pan | ............................ | H04L 1/00 |
| | | | | 370/329 |
| 2016/0269218 A1* | 9/2016 | Zhang | ................... | H04L 1/0016 |
| 2018/0323900 A1* | 11/2018 | Gulati | ................... | H04L 1/0016 |
| 2019/0190644 A1 | 6/2019 | Ugurlu et al. | | |
| 2019/0260495 A1* | 8/2019 | Nammi | ................. | H04L 1/0016 |

(Continued)

FOREIGN PATENT DOCUMENTS

| | | |
|---|---|---|
| CN | 109246047 A | 1/2019 |
| CN | 110034859 A | 7/2019 |

(Continued)

OTHER PUBLICATIONS

European Patent Office, Extended European Search Report issued in Application No. 20961896.6 dated Dec. 15, 2023, 17 pages.

(Continued)

*Primary Examiner* — Ayman A Abaza
*Assistant Examiner* — Camquyen Thai
(74) *Attorney, Agent, or Firm* — Finnegan, Henderson, Farabow, Garrett & Dunner, L.L.P.

(57) ABSTRACT
A method for configuring a modulation and coding scheme (MCS) is performed by a terminal, and includes: determining an MCS table used by the terminal for part of channels during a random access procedure based on a designated scheme; wherein the designated scheme includes any one of: a scheme based on an indication message and a preconfigured rule.

17 Claims, 7 Drawing Sheets determining a current measurement value of a reference signal received power (RSRP) corresponding to the terminal currently — 501 determining the MCS table used by the terminal for all or part of channels during the random access procedure based on the current measurement value of the RSRP — 502

(56) References Cited

U.S. PATENT DOCUMENTS

| | | | |
|---|---|---|---|
| 2019/0312708 A1 | 10/2019 | Bai et al. | |
| 2019/0313287 A1* | 10/2019 | Li | H04W 28/18 |
| 2019/0394785 A1* | 12/2019 | He | H04L 1/0023 |
| 2020/0259896 A1 | 8/2020 | Sachs et al. | |
| 2020/0343995 A1 | 10/2020 | Shao et al. | |
| 2021/0058823 A1 | 2/2021 | Liu et al. | |
| 2021/0126733 A1* | 4/2021 | Chen | H04W 74/0833 |
| 2021/0234571 A1* | 7/2021 | Wang | H04L 1/0009 |
| 2022/0078852 A1* | 3/2022 | Kwak | H04W 24/10 |
| 2023/0072763 A1* | 3/2023 | Kim | H04W 74/0841 |
| 2023/0122052 A1* | 4/2023 | Zhou | H04W 72/02 |
| | | | 370/329 |
| 2023/0199862 A1* | 6/2023 | Li | H04W 52/08 |
| | | | 370/329 |

FOREIGN PATENT DOCUMENTS

| | | |
|---|---|---|
| CN | 111935670 A | 11/2020 |
| WO | WO 2019141061 A1 | 7/2019 |
| WO | WO 2019141232 A1 | 7/2019 |
| WO | WO 2020192700 A1 | 10/2020 |

OTHER PUBLICATIONS

International Search Report and Written Opinion of International Application No. PCT/CN2020/129861, dated Jul. 26, 2021, 14 pages.
Futurewei: "Coverage Recovery for RedCap", 3GPP TSG RAN WG1 Meeting #103-e, R1-2007536, e-Meeting, Oct. 26-Nov. 13, 2020, 10 pages.

* cited by examiner determining an MCS table used by a terminal for all or part of channels during a random access procedure based on a designated scheme; wherein the designated scheme comprises any one of: a terminal capability, an indication message and a preconfigured rule — 101

FIG. 1 in response to the terminal being a first-capability terminal, determining that a first MCS table is used by the terminal for all or part of channels during the random access procedure — 201 in response to the terminal being a second-capability terminal, determining that a second MCS table is used by the terminal for all or part of channels during the random access procedure; wherein at least one same MCS index corresponds to a less spectral efficiency in the first MCS table than in the second MCS table — 202

FIG. 2 in response to detecting the broadcast indication message, determining the MCS table used by the terminal for all or part of channels during the random access procedure based on an indication of the broadcast indication message — 301

FIG. 3 determining an MCS table used by a terminal for all or part of channels during a random access procedure based on a designated scheme; wherein the designated scheme is based on a channel indication message in the random access procedure    401

FIG. 4

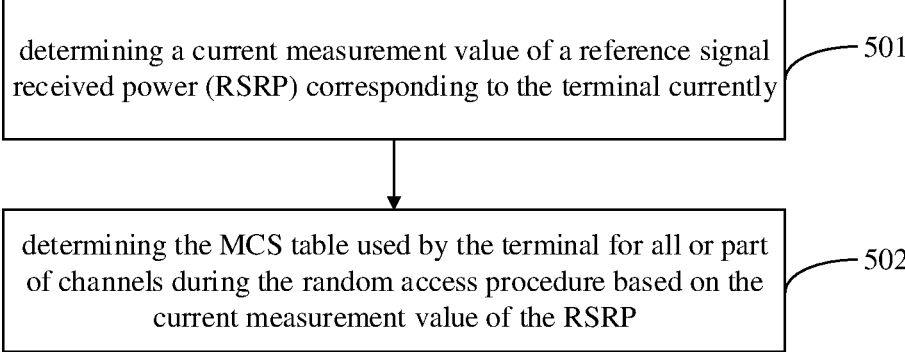

determining a current measurement value of a reference signal received power (RSRP) corresponding to the terminal currently    501 determining the MCS table used by the terminal for all or part of channels during the random access procedure based on the current measurement value of the RSRP    502

FIG. 5

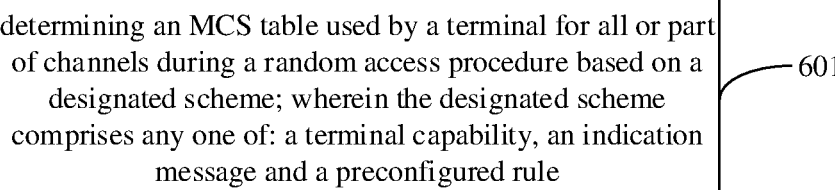

determining an MCS table used by a terminal for all or part of channels during a random access procedure based on a designated scheme; wherein the designated scheme comprises any one of: a terminal capability, an indication message and a preconfigured rule
— 601

FIG. 6

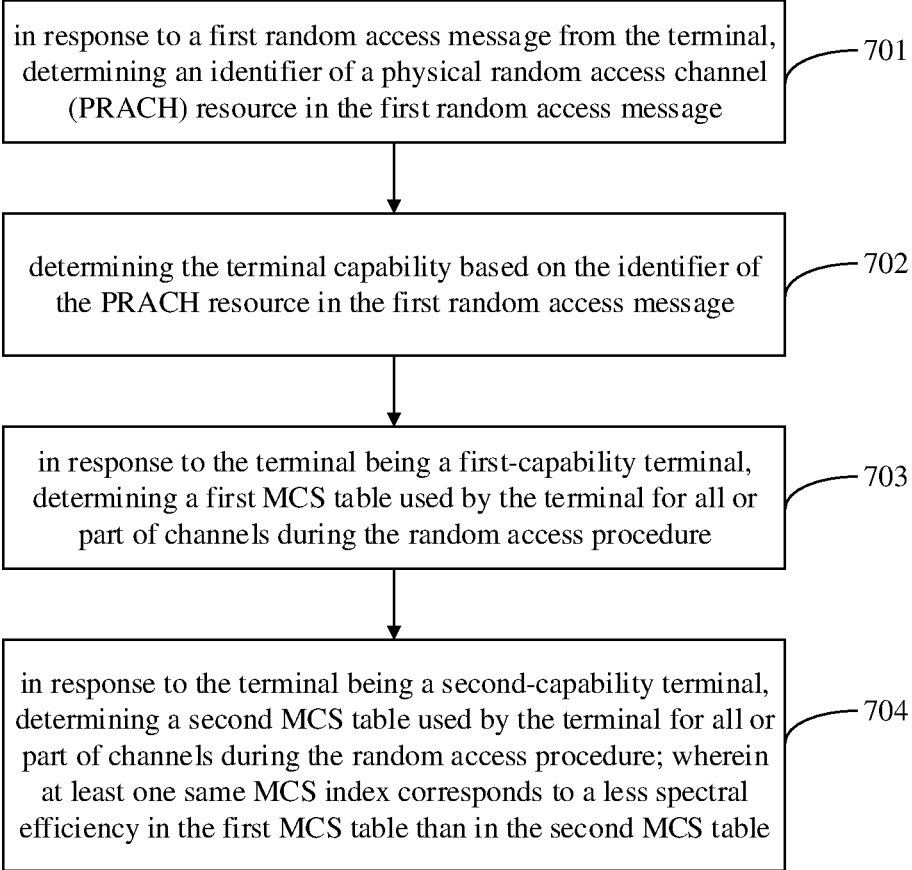

in response to a first random access message from the terminal, determining an identifier of a physical random access channel (PRACH) resource in the first random access message
— 701 determining the terminal capability based on the identifier of the PRACH resource in the first random access message
— 702 in response to the terminal being a first-capability terminal, determining a first MCS table used by the terminal for all or part of channels during the random access procedure
— 703 in response to the terminal being a second-capability terminal, determining a second MCS table used by the terminal for all or part of channels during the random access procedure; wherein at least one same MCS index corresponds to a less spectral efficiency in the first MCS table than in the second MCS table
— 704

FIG. 7 in response to determining the MCS table used by the terminal for all or part of channels during the random access procedure, transmitting the broadcast indication message
— 801

FIG. 8 determining an MCS table used by a terminal for all or part of channels during a random access procedure based on a designated scheme; wherein the designated scheme is based on a channel indication message in the random access procedure ⌐ 901

FIG. 9

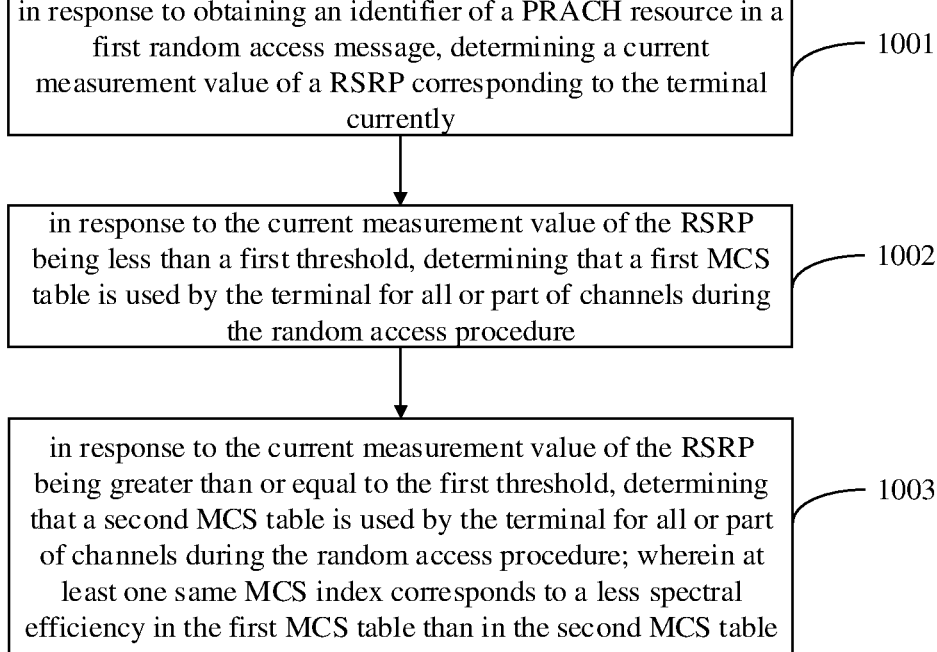

in response to obtaining an identifier of a PRACH resource in a first random access message, determining a current measurement value of a RSRP corresponding to the terminal currently — 1001 in response to the current measurement value of the RSRP being less than a first threshold, determining that a first MCS table is used by the terminal for all or part of channels during the random access procedure — 1002 in response to the current measurement value of the RSRP being greater than or equal to the first threshold, determining that a second MCS table is used by the terminal for all or part of channels during the random access procedure; wherein at least one same MCS index corresponds to a less spectral efficiency in the first MCS table than in the second MCS table — 1003

FIG. 10

MODULATION AND CODING SCHEME (MCS) CONFIGURATION METHOD AND APPARATUS, AND COMMUNICATION DEVICE

CROSS-REFERENCE TO RELATED APPLICATION

This application is a national phase of International Application No. PCT/CN2020/129861, filed on Nov. 18, 2020, the entire content of which is incorporated herein by reference.

TECHNICAL FIELD

The disclosure relates to the field of wireless communication technologies, and in particular, to a method and an apparatus for configuring a modulation and coding scheme (MCS) and a communication device.

BACKGROUND

Internet of Things (IoT) services, such as video surveillance, smart home, wearable devices and industrial sensing and monitoring, have relatively high requirements on the network speed and delay. Therefore, many companies have proposed to design a new user equipment (UE) in the fifth-generation mobile communication technology (5G) new radio (NR), to cover these requirements of the IoT services. This new UE is called a reduced capability (redcap) terminal. For the redcap terminal, the coverage loss will be brought about due to the reduction of terminal capabilities, such as the reduction of the number of reception antennas, so the coverage enhancement is required.

SUMMARY

A method for configuring an MCS, provided in an aspect of the disclosure, is performed by a terminal and includes: determining an MCS table used by the terminal for part of channels during a random access procedure based on a designated scheme; in which the designated scheme includes any one of: a scheme based on a terminal capability, a scheme based on an indication message and a preconfigured rule.

A method for configuring an MCS, provided in another aspect of the disclosure, is performed by a network device and includes: determining an MCS table used by a terminal for part of channels during a random access procedure based on a designated scheme; in which the designated scheme includes any one of: a scheme based on a terminal capability, a scheme based on an indication message and a preconfigured rule.

A communication device, provided in another aspect of the disclosure, includes: a transceiver; a memory; and a processor, respectively connected to the transceiver and the memory and configured to, by executing computer-executable instructions on the memory, control signal transmissions and receptions of the transceiver and perform the aforementioned method for configuring an MCS.

A computer storage medium, provided in another aspect of the disclosure, has stored therein computer-executable instructions. When the computer-executable instructions are executed by a processor, the aforementioned method for configuring an MCS is performed.

BRIEF DESCRIPTION OF THE DRAWINGS

Example embodiments are described below with reference to the drawings, in which:

FIG. 1 is a flowchart of a method for configuring an MCS, according to some embodiments of the disclosure.

FIG. 2 is a flowchart of another method for configuring an MCS, according to some embodiments of the disclosure.

FIG. 3 is a flowchart of still another method for configuring an MCS, according to some embodiments of the disclosure.

FIG. 4 is a flowchart of yet another method for configuring an MCS, according to some embodiments of the disclosure.

FIG. 5 is a flowchart of yet another method for configuring an MCS, according to some embodiments of the disclosure.

FIG. 6 is a flowchart of another method for configuring an MCS, according to some embodiments of the disclosure.

FIG. 7 is a flowchart of still another method for configuring an MCS, according to some embodiments of the disclosure.

FIG. 8 is a flowchart of yet another method for configuring an MCS, according to some embodiments of the disclosure.

FIG. 9 is a flowchart of yet another method for configuring an MCS, according to some embodiments of the disclosure.

FIG. 10 is a flowchart of another method for configuring an MCS, according to some embodiments of the disclosure.

DETAILED DESCRIPTION

Figure 11:
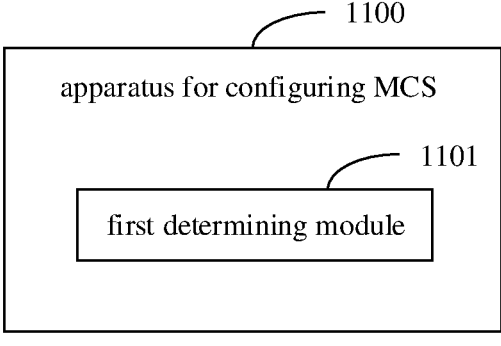
FIG. 11 is a block diagram of an apparatus for configuring an MCS, according to some embodiments of the disclosure.

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with embodiments of the disclosure. Instead, they are merely examples of apparatuses and methods consistent with aspects related to embodiments of the disclosure as recited in the appended claims.

The terms used in embodiments of the disclosure are only for the purpose of describing specific embodiments, and are not intended to limit embodiments of the disclosure. The singular forms of "a" and "the" used in embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in embodiments of the disclosure to describe various information, the information should not be limited to these terms. These terms are only used to distinguish the same type of information from each other. For example, without departing from the scope of embodiments of the disclosure, the first information may also be referred to as the second information, and similarly, the second information may also be referred to as the first information. Depending on the context, the word "if" as used herein can be interpreted as "when", "while" or "in response to determining".

Embodiments of the disclosure are described in detail below. Examples of the embodiments are illustrated in the accompanying drawings where the same or similar numbers throughout indicate the same or similar elements. The embodiments described below by reference to the accompanying drawings are illustrative and are intended to interpret the disclosure and are not to be construed as a limitation of the disclosure.

Aiming at the problems in the related art that the MCS table may not be configured during the random access procedure to enhance the coverage, some embodiments of the disclosure proposes a method for configuring an MCS.

The method for configuring an MCS, provided in some embodiments of the disclosure, determines the MCS table used by the terminal for all or part of channels during the random access procedure based on the designated scheme; in which the designated scheme includes any one of: a scheme based on the terminal capability, a scheme based on the indication message and the preconfigured rule. Therefore, by presetting the designated scheme for configuring the MCS table during the random access procedure of the terminal, the MCS table can also be configured according to requirements during the random access procedure, thereby realizing the coverage enhancement during the random access procedure.

The method and the apparatus for configuring an MCS, the communication device and the storage medium, provided in the disclosure, will be described in detail below with reference to the accompanying drawings.

Figures 1, 2, 3:
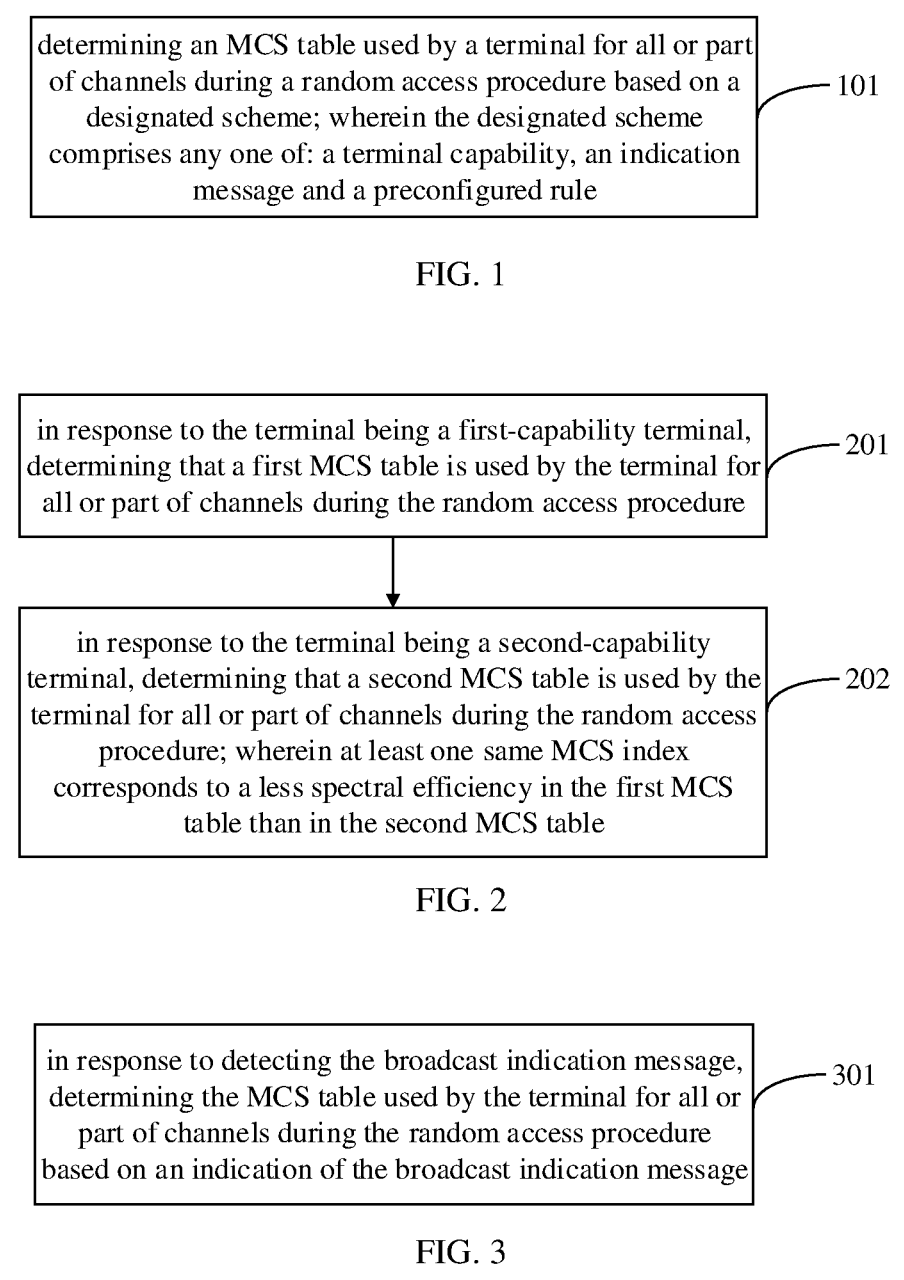

FIG. 1 is a flowchart of a method for configuring an MCS, according to some embodiments of the disclosure. The method is applicable to a terminal.

As illustrated in FIG. 1, the method for configuring an MCS includes the following step.

Step 101, an MCS table used by a terminal for all or part of channels during a random access procedure, is determined based on a designated scheme, in which the designated scheme includes any one of: a scheme based on a terminal capability, a scheme based on an indication message and a preconfigured rule.

It should be noted that, the method for configuring an MCS in some embodiments of the disclosure can be applicable to any terminal. A terminal may be a device that provides voice and/or data connectivity to a user. The terminal can communicate with one or more core networks via a radio access network (RAN). The terminal can be an IoT terminal. The terminal can be such as a sensor device, a mobile phone (or a cellular phone) and a computer with the IoT terminal such as a fixed, portable, pocket-sized, hand-held, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal may also be a device of an unmanned aircraft. Alternatively, the terminal may also be a vehicle-mounted device, for example, a trip computer having a wireless communication function or a wireless communication device connected to the trip computer. Alternatively, the terminal may also be a roadside device, for example, a street lamp, a signal lamp or other roadside device having the wireless communication function.

The channels during the random access procedure may include a channel for transmitting a first random access message (Msg.1), a channel for transmitting a second random access message (Msg.2), a channel for transmitting a third random access message (Msg.3), a channel for transmitting a fourth random access message (Msg.4), and the like.

It should be noted that, because during the random access procedure of the terminal, each channel for data transmission between the terminal and the base station will also experience the coverage loss, so it is also possible to configure the MCS table used for each channel during the random access procedure. In this way, the coverage enhancement is performed to improve the data transmission quality of each channel during the random access procedure. However, the configuration of the MCS table is completed by the RRC. The RRC connection has not been established during the random access procedure of the terminal, so the configuration of the MCS table during the random access procedure may not be implemented through the RRC. Therefore, in some embodiments of the disclosure, during the random access procedure of the terminal, the configuration scheme of the MCS table can be reset, so as to configure the MSC table used for each channel during the random access procedure.

In all the embodiments of the disclosure, for the terminal that needs the coverage enhancement, there are two available MCS tables. One of MCS tables, for example, can be used to cover situations with better terminal capabilities or other appropriate situations, and the other of MCS tables, for example, can be used to cover situations with poor terminal capabilities or situations with higher transmission requirements (such as higher bit error rate requirements) or other appropriate situations. In all the embodiments of the disclosure, at least one same MCS index corresponds to a less spectral efficiency in the first MCS table than in the second MCS table. For example, the two MCS tables may be the first MCS table in Table 1 and the second MCS table in Table 2.

TABLE 1

| MCS index $I_{MCS}$ | Modulation Order $Q_m$ | Target code Rate Rx [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |

5

TABLE 1-continued

| MCS index $I_{MCS}$ | Modulation Order $Q_m$ | Target code Rate Rx [1024] | Spectral efficiency |
|---|---|---|---|
| 29 | 2 | reserved | |
| 30 | 4 | reserved | |
| 31 | 6 | reserved | |

It can be understood that each element and each correspondence in Table 1 exist independently; and these elements and correspondences are exemplarily listed in the same table but do not represent that all the elements and correspondences in the table must exist according to the coexistence in Table 1. Each element value and each correspondence are independent of any other element value or correspondence in Table 1. Therefore, those skilled in the art can understand that each element value and each correspondence in Table 1 each are independent embodiment.

TABLE 2

| MCS index $I_{MCS}$ | Modulation Order $Q_m$ | Target code Rate Rx [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

It can be understood that each element and each correspondence in Table 2 exist independently; and these elements and correspondences are exemplarily listed in the same table but do not represent that all the elements and correspondences in the table must exist according to the coexistence in Table 2. Each element value and each correspondence are independent of any other element value or correspondence in Table 2. Therefore, those skilled in the art can understand that each element value and each correspondence in Table 2 each are independent embodiment.

As a possible implementation manner, since the applicable scenarios of the two MCS tables are related to the terminal capability, during the random access procedure of the terminal, the MCS table suitable for the terminal capability can be selected according to the terminal capability, and according to the current communication process of the terminal and the base station, the determined MCS table is used in the corresponding channel.

As another possible implementation manner, the MCS table used for each channel can also be set by the base station. Therefore, the terminal can obtain the indication message from the base station and parse the indication message to determine the MCS table used during the random access procedure.

As another possible implementation manner, a rule for determining the MCS table may also be preconfigured, so that during the random access procedure of the terminal, the MCS table used for each channel may be determined according to the preconfigured rule. For example, the preconfigured rule may be a mapping relationship between channels and MCS tables during the random access procedure, which is not limited in some embodiments of the disclosure.

The method for configuring an MCS, provided in some embodiments of the disclosure, determines the MCS table used by the terminal for all or part of channels during the random access procedure based on the designated scheme; in which the designated scheme includes any one of: a scheme based on the terminal capability, a scheme based on the indication message and the preconfigured rule. Therefore, by presetting the designated scheme for configuring the MCS table during the random access procedure of the terminal, the MCS table can also be configured according to requirements during the random access procedure, thereby realizing the coverage enhancement during the random access procedure.

In a possible implementation of the disclosure, the MCS table matching the terminal capability may be used during the random access procedure of the terminal, so as to improve the reliability of data transmission during the random access procedure.

The following further describes another method for configuring an MCS provided in some embodiments of the disclosure, with reference to FIG. 2.

FIG. 2 is a flowchart of another method for configuring an MCS, according to some embodiments of the disclosure, which is applicable to a terminal.

As illustrated in FIG. 2, the method for configuring an MCS includes the following steps.

Step 201, in response to the terminal being a first-capability terminal, it is determined that a first MCS table is used by the terminal for all or part of channels during the random access procedure.

As a possible implementation manner, since the applicable scenarios of the two MCS tables are related to the terminal capability, the designated scheme may be the scheme based on the terminal capability. Therefore, during the random access procedure of the terminal, the MCS table suitable to the terminal capability can be determined according to the terminal capability. The determined MCS table can be used in the corresponding channel according to the current communication process between the terminal and the base station.

The first-capability terminal may be a terminal with a lower user capability; and relatively speaking, a user capability of the first-capability terminal may be lower than a user capability of the second-capability terminal. The user capability may include any one of: a number of reception antennas and a reception bandwidth. For example, the first-capability terminal may be a redcap terminal applicable in the 5G NR mode and the second-capability terminal may be an ordinary terminal applicable in long term evolution (LTE) or 5G or any generation of communication systems, which are not limited in some embodiments.

In some embodiments of the disclosure, since the user capability of the first-capability terminal is insufficient, in response to the terminal being the first-capability terminal, the first MCS table with a lower spectral efficiency may be used during the random access procedure, for example, it may be the first MCS table in Table 1.

In some embodiments of the disclosure, step 201 may be implemented in any of embodiments of the disclosure, which is not limited in embodiments of the disclosure and will not be described again.

Step 202, in response to the terminal being a second-capability terminal, it is determined that a second MCS table is used by the terminal for all or part of channels during the random access procedure, in which at least one same MCS index corresponds to a less spectral efficiency in the first MCS table than in the second MCS table.

In some embodiments of the disclosure, since the user capability of the second-capability terminal is better, in response to the terminal being the second-capability terminal, the second MCS table with a higher spectral efficiency may be used during the random access procedure. For example, it may be the second MCS table in Table 2.

It should be noted that, in some embodiments of the disclosure, all or part of channels of the first-capability terminal during the random access procedure may be limited to use the first MCS table while and all or part of channels of the second-capability terminal during the random access procedure may be limited to use the second MCS table.

Alternatively, it is also possible to only limit the first-capability terminal to use the first MCS table for all or part of channels during the random access procedure, but not to limit the MCS table used by the second-capability terminal. For example, in response to the terminal being the second-capability terminal, the first MCS table or the second MCS table may be randomly used during the random access procedure.

Alternatively, it is also possible to only limit the second-capability terminal to use the second MCS table for all or part of channels during the random access procedure, but not to limit the MCS table used by the first-capability terminal. For example, in response to the terminal being the first-capability terminal, the first MCS table or the second MCS table may be randomly used during the random access procedure.

Further, the terminal may first transmit its own user capability to the base station, so that the base station determines the MCS table used for each channel during the random access procedure according to the terminal capability. That is, in a possible implementation of some embodiments of the disclosure, before the above step 201, it may further include the following.

An identifier of a physical random access channel (PRACH) resource in a first random access message transmitted to the base station, is determined based on the terminal capability.

Or, indication information in uplink (UL) grant in a third random access message transmitted to the base station, is determined based on the terminal capability.

As a possible implementation manner, since the terminal will transmit the first random access message to the base station during the random access procedure, the terminal may determine the identifier of the PRACH resource in the first random access message according to the terminal capability when transmitting the first random access message to the base station, to indicate whether the terminal is the first-capability terminal or the second-capability terminal by using the identifier of the PRACH resource in the first random access message. Therefore, after obtaining the first random access message, the base station can determine the terminal capability according to the identifier of the PRACH resource in the first access message; and in response to determining that the terminal is the first-capability terminal, determine that the first MCS table is used during the random access procedure of the terminal when the second random access message or the third random access message or the fourth random access message are transmitted; and in response to determining that the terminal being the second-capability terminal, determine that the second MCS table is used during the random access procedure of the terminal when the second random access message or the third random access message or the fourth random access message are transmitted.

As another possible implementation manner, since the terminal will transmit the third random access message to the base station during the random access procedure, the terminal may determine the indication information in the UL grant in the third random access message according to the terminal capability when transmitting the third random access message to the base station, to indicate whether the terminal is the first-capability terminal or the second-capability terminal by the indication information in the UL grant in the third random access message. Therefore, after obtaining the third random access message, the base station can determine the terminal capability according to the indication information in the UL grant in the third random access message; and in response to the terminal being the first-capability terminal, determine that the first MCS table is used during the random access procedure of the terminal when the second random access message or the third random access message or the fourth random access message are transmitted; and in response to the terminal being the second-capability terminal, determine that the second MCS table is used during the random access procedure of the terminal when the second random access message or the third random access message or the fourth random access message are transmitted.

In the method for configuring an MCS provided in some embodiments of the disclosure, in response to the terminal being the first-capability terminal, it is determined that the terminal uses the first MCS table for all or part of channels during the random access procedure, or in response to the terminal being the second-capability terminal, it is determined that the terminal uses the second MCS table for all or part of channels during the random access procedure. In all the embodiments of the disclosure, at least one same MCS index corresponds to a less spectral efficiency in the first MCS table than in the second MCS table. Therefore, by configuring the MCS table matching the terminal capability during the random access procedure according to the terminal capability, the MCS table can also be configured according to requirements during the random access procedure, thereby realizing the coverage enhancement of the random access procedure and further improving the reliability of data transmission during the random access procedure.

In a possible implementation of the disclosure, the base station may also notify the terminal of the MCS table used for each channel during the random access procedure in the form of broadcasting.

The following further describes still another method for configuring an MCS provided in some embodiments of the disclosure, with reference to FIG. 3.

FIG. 3 is a flowchart of still another method for configuring an MCS provided, according to some embodiments of the disclosure, which is applicable to a terminal.

As illustrated in FIG. 3, the method for configuring an MCS includes the following step.

Step 301, in response to detecting the broadcast indication message, the MCS table used by the terminal for all or part of channels during the random access procedure is determined based on an indication of the broadcast indication message.

As another possible implementation manner, the MCS table used for each channel can be set by the base station. Therefore, the terminal can obtain the indication message from the base station and parse the indication message to determine the MCS used during the random access procedure. Optionally, the base station may notify the terminal of the MCS table used for all or part of channels during the random access procedure by means of broadcasting, that is, the indication message may be the broadcast indication message.

As an example, the base station may transmit the broadcast indication message to the terminal through a broadcast channel when it needs to notify the terminal of the MCS table used for all or part of channels during the random access procedure. Therefore, in response to detecting the broadcast indication message from the base station, the terminal can determine the MCS table used by the terminal for all or part of channels during the random access procedure according to the indication of the broadcast indication message; and in response to not detecting the broadcast indication message from the base station, the first MCS table or the second MCS table may be used by default according to settings.

Optionally, the broadcast indication message may be used to indicate a correspondence between capability terminals and MCS tables; and correspondingly, the above step 301 may include the following.

The terminal capability is determined in response to detecting the broadcast indication message.

The MCS table used by the terminal for all or part of channels during the random access procedure is determined based on the correspondence between capability terminals and MCS tables, indicated by the broadcast indication message, and the terminal capability.

In some embodiments of the disclosure, the base station may determine MCS tables used by various capability terminals during the random access procedure according to its own scheme, and carry the correspondence between capability terminals and MCS tables in the broadcast indication message and transmit it to the terminal. Therefore, in response to detecting the broadcast indication message from the base station, the terminal can obtain the correspondence between capability terminals and MCS tables from the broadcast indication message, and based on its own terminal capability, obtain the MCS table corresponding to the terminal capability from the correspondence between capability terminals and MCS tables, and uses the determined MCS table for all or part of channels during the random access procedure. In detail, after the terminal determines the MCS table, if the first random access message, the second random access message, the third random access message and the fourth random access message are not transmitted, the determined MCS table is used for all the channels during the random access procedure; and if the terminal has already transmitted part of random access messages after determining the MCS table, the determined MCS table can be used for a part of channels in which the remaining random access messages are transmitted.

For example, the correspondence between capability terminals and MCS tables included in the broadcast indication message is: the first-capability terminal corresponding to the first MCS table and the second-capability terminal corresponding to the second MCS table. If the terminal is the first-capability terminal, the terminal can use the first MCS table for all or part of channels during the random access procedure.

Optionally, the broadcast indication message may also be used to indicate a correspondence between channels and MCS tables; correspondingly, the above step 301 may include the following.

In response to detecting the broadcast message, the MCS table used by the terminal for all or part of channels during the random access procedure is determined based on the correspondence between channels and MCS tables, indicated by the broadcast message.

In some embodiments of the disclosure, since different types of channels may have different transmission rates, delay characteristics, etc., the base station may also configure the MCS table matching each channel according to the channel characteristics, and carry the correspondence between channels and MCS tables in the broadcast indication message and transmit it to the terminal to ensure the transmission rate and reliability of data for each channel. Therefore, in response to detecting the broadcast indication message from the base station, the terminal can obtain the correspondence between channels and MCS tables from the broadcast indication message, determine the MCS table used for each channel during the random access procedure, and use the corresponding MCS table according to the channel used for each data transmission during the subsequent random access procedure.

For example, the correspondence between channels and MCS tables included in the broadcast indication message is: the MCS table corresponding to the second random access message and the third random access message being the second MCS table, and the MCS table corresponding to the fourth random access message being the first MCS table. Therefore, the terminal can use the second MCS table when transmitting the third random access message to the base station during the random access procedure.

Optionally, the base station may also determine MCS tables used by different capability terminals in different channels according to terminal capabilities and channel characteristics at the same time. That is, in a possible implementation manner of some embodiments of the disclosure, the above broadcast indication message may be used to indicate a correspondence between capability terminals in different channels and MCS tables; correspondingly, the above step 301 may include the following.

In response to detecting the broadcast indication message, the terminal capability is determined.

The MCS table used by the terminal for all or part of channels during the random access procedure, is determined, based on the correspondence between capability terminals in different channels and MCS tables, indicated by the broadcast indication message, and the terminal capability.

In some embodiments of the disclosure, since the applicable scenarios of the two MCS tables can be related to both the terminal capabilities and channel characteristics, the terminal capabilities and channel types can be comprehensively considered to determine the MCS tables used by different terminals in different channels to further improve the rate and reliability of data transmission. Therefore, the base station can configure the MCS tables that match various capability terminals for each channel according to the terminal capabilities and the channel characteristics, and carry the correspondence between various capability terminals in different channels and MCS tables in the broadcast instruction message and transmit it to the terminal to further improve the rate and reliability of data transmission of various capability terminals for each channel. Therefore, in response to detecting the broadcast indication message from the base station, the terminal can obtain the correspondence between capability terminals in different channels and MCS tables from the broadcast indication message, and according to its own terminal capability, determine the MCS table used for each channel during the random access procedure of the terminal from the corresponding between capability terminals in different channels and MCS tables, and the corresponding MCS table is used according to the channel used for each data transmission in the subsequent random access procedure.

For example, the correspondence between capability terminals in different channels and MCS tables included in the broadcast indication message is illustrated in Table 3. If the terminal is the first-capability terminal 1, the second MCS table can be used when the second random access and the third random access message are transmitted during the random access procedure, and the first MCS table can be used when the fourth random access message is transmitted; and if the terminal is the first-capability terminal 2, the second MCS table may be used when the second random access message is transmitted, and the first MCS table may be used when the third random access message and the fourth random access message are transmitted.

TABLE 3

|  | second random access message | third random access message | fourth random access message |
|---|---|---|---|
| first-capability terminal 1 | second table | second table | first table |
| first-capability terminal 2 | second table | first table | first table |

It can be understood that each element and each correspondence in Table 3 exist independently; and these elements and correspondences are exemplarily listed in the same table but do not represent that all the elements and correspondences in the table must exist according to the coexistence in Table 3. Each element value and each correspondence are independent of any other element value or correspondence in Table 3. Therefore, those skilled in the art can understand that each element value and each correspondence in Table 3 each are independent embodiment.

As another example, when the base station does not need to notify the terminal of the MCS table used for all or part of channels during the random access procedure, it may transmit the broadcast indication message to the terminal through the broadcast channel to indicate that the terminal does not need to determine the MCS table used in the channel during the random access procedure currently. Therefore, the terminal can also determine that the terminal uses the designated MCS table for all or part of channels during the random access procedure in response to not detecting the broadcast indication message. That is, in response to not detecting the broadcast indication message, the terminal can determine that it currently needs to determine the MCS table used for each channel during the random access procedure, and determine the MCS table used for each channel during the random access procedure according to a preset rule; and in responding to detecting the broadcast indication message from the base station, the first MCS table or the second MCS table may be used by default according to the settings.

In some embodiments of the disclosure, step 301 may be implemented in any one of embodiments of the disclosure, which is not limited in embodiments of the disclosure, and will not be described again.

In the method for configuring an MCS provided in some embodiments of the disclosure, in response to detecting the broadcast indication message, the MCS table used by the terminal for all or part of channels during the random access procedure is determined based on the indication of the broadcast indication message, or in response to not detecting the broadcast indication message, the designated MCS table used by the terminal for all or part of channels during the random access procedure is determined. Therefore, by determining the MCS table used for each channel of the terminal during the random access procedure based on the broadcast instruction message of the base station, the MCS table can also be configured based on the requirements during the random access procedure, thereby realizing the coverage enhancement of the random access procedure and further improving the reliability of data transmission during the random access procedure.

In a possible implementation of the disclosure, the base station may also notify the terminal of the MCS table used for each channel during the random access procedure through scheduling information during the random access procedure.

Yet another method for configuring an MCS provided in some embodiments of the disclosure is further described below, with reference to FIG. 4.

FIG. 4 is a flowchart of yet another method for configuring an MCS, according to some embodiments of the disclosure.

As illustrated in FIG. 4, the method for configuring an MCS includes the following step.

Step 401, an MCS table used by a terminal for all or part of channels during a random access procedure, is determined based on a designated scheme, in which the designated scheme is based on a channel indication message during the random access procedure.

As a possible implementation, the base station may indicate the MCS table used for each channel in the second random access message and/or the fourth random access message when transmitting the second random access message and/or the fourth random access message to the terminal.

Optionally, the base station may carry indication information for indicating an MCS table used in the second random access message in a physical downlink control channel (PDCCH) of the second random access message. That is, in a possible implementation of some embodiments of the disclosure, the foregoing step 401 may include the following.

In response to indication information carried in a PDCCH of a second random access message, from a base station, an MCS table used in the second random access message is determined.

In some embodiments of the disclosure, when transmitting the second random access message to the terminal during the random access procedure, the base station may only carry, the indication information for indicating the MCS table used in the second random access message, in the PDCCH of the second random access message. Therefore, in response to obtaining the second random access message from the base station, the terminal may obtain the MCS table used in the second random access message from the indication information carried in the PDCCH of the second random access message.

Optionally, the base station may further carry indication information for indicating an MCS table used in at least one of the second random access message, the third random access message and the fourth random access message in the PDCCH of the second random access message. That is, in a possible implementation of some embodiments of the disclosure, the above step 401 may include the following.

In response to indication information carried in a PDCCH of a second random access message, from abase station, an MCS used in the second random access message and/or a third random access message and/or a fourth random access message is determined.

In some embodiments of the disclosure, when transmitting the second random access message to the terminal during the random access procedure, the base station may carry, the indication information for indicating the MCS table used in at least one of the second random access message, the third random access message and the third random access message, in the PDCCH of the second random access message. Therefore, in response to obtaining the second random access message from the base station, the terminal may obtain the MCS table used in the second random access message, the third random access message and the first random access message from the indication information carried in the PDCCH of the second random access message.

Optionally, the base station may further carry indication information for indicating an MCS table used in at least one of the third random access message and the fourth random access message in the PDCCH of the second random access message. That is, in a possible implementation of some embodiments of the disclosure, the above step 401 may include the following.

In response to indication information carried in a PDCCH of a second random access message, from a base station, an MCS table used in a third random access message and/or a fourth random access message is determined.

In some embodiments of the disclosure, when transmitting the second random access message to the terminal during the random access procedure, the base station may carry, the indication information for indicating the MCS table used in at least one of the third random access message and the third random access message, in the PDCCH of the second random access message. Therefore, in response to obtaining the second random access message from the base station, the terminal may obtain the MCS table used in the third random access message and the fourth random access message from the indication information carried in the PDCCH of the second random access message.

Optionally, the base station may further carry indication information for indicating an MCS table used in the fourth random access message in a PDCCH of the fourth random access message. That is, in a possible implementation of some embodiments of the disclosure, the foregoing step 401 may include the following.

In response to indication information carried in a PDCCH of a fourth random access message, from a base station, an MCS table used in the fourth random access message is determined.

In some embodiments of the disclosure, the base station may carry the MCS table used in the fourth random access message when transmitting the fourth random access message to the terminal during the random access procedure. Therefore, in response to obtaining the fourth random access message from the base station, the terminal may obtain the MCS table used in the fourth random access message from the indication information carried in the PDCCH of the fourth random access message.

In some embodiments of the disclosure, step 401 may be implemented in any one of embodiments of the disclosure, which is not limited in embodiments of the disclosure, and will not be described again.

In the method for configuring an MCS provided in some embodiments of the disclosure, the MCS table used by the terminal for all or part of channels during the random access procedure, is determined based on the designated scheme, in which the designated scheme is based on the channel indication message during the random access procedure. Therefore, the MCS table used for each channel of the terminal during the random access procedure is determined according to the channel indication message from the base station during the random access procedure, so that the MCS table can also be configured according to the requirements during the random access procedure. The coverage enhancement during the random access procedure is realized and the reliability of data transmission during the random access procedure is further improved.

In a possible implementation of the disclosure, the base station may also determine the MCS table used by the terminal for each channel during the random access procedure, according to a preset rule, for example, according to a current measurement value of a reference signal receiving power (RSRP) of the terminal.

Yet another method for configuring an MCS provided in some embodiments of the disclosure is further described below, with reference to FIG. 5.

FIG. 5 is a flowchart of yet another method for configuring an MCS, according to some embodiments of the disclosure, which is applicable to a terminal.

As illustrated in FIG. 5, the method for configuring an MCS includes the following steps.

Step 501, a current measurement value of an RSRP corresponding to the terminal currently is determined.

As a possible implementation manner, a rule for determining the MCS table may also be preconfigured, so that during the random access procedure of the terminal, the MCS table used for each channel may be determined according to the preconfigured rule. For example, the preconfigured rule may be to determine the MCS table used by the terminal for all or part of channels during the random access procedure according to the current measurement value of the RSRP.

In some embodiments of the disclosure, since the current measurement value of the RSRP of the terminal can reflect the current user capability and the current actual transmission performance of the terminal. Therefore, the MCS table used is for each channel during the random access procedure can be determined according to the current measurement value of the RSRP, to satisfy the current real-time performance requirements of the terminal. Therefore, the terminal can measure the RSRP during the random access procedure, so as to determine the MCS table used for each channel during the random access procedure according to the range of the current RSRP measurement value.

Further, after measuring the current measurement value of the RSRP, the terminal may transmit the current measurement value of the RSRP to the base station, so that the base station determines the MCS table used for each channel matching the current measurement value of the RSRP. That is, in a possible implementation manner of some embodiments of the disclosure, after the above step 501, it may further include the following.

An identifier of a PRACH resource in a first random access message that is transmitted to a base station is determined based on the current measurement value of the RSRP, in which the identifier of the PRACH resource is configured to represent the MCS table used by the terminal for all or part of channels during the random access procedure.

In some embodiments of the disclosure, since the terminal will transmit the first random access message to the base station during the random access procedure, the terminal may, when transmitting the first random access message to the base station, determine the identifier of the PRACH resource in the first random access message according to the current measurement value of the RSRP. The identifier of the PRACH resource in the first random access message is configured to indicate the current measurement value of the RSRP. Therefore, after obtaining the first random access message, the base station can determine the current measurement value of the RSRP according to the identifier of the PRACH resource in the first access message, so as to determine the MCS table for each channel during the random access procedure according to the current measurement value of the RSRP.

In some embodiments of the disclosure, step 501 may be implemented in any of embodiments of the disclosure, which is not limited in embodiments of the disclosure, and will not be described again.

Step 502, the MCS table used by the terminal for all or part of channels during the random access procedure is determined based on the current measurement value of the RSRP.

In some embodiments of the disclosure, the current measurement value of the RSRP of the terminal may reflect the current actual transmission performance of the terminal. In detail, the smaller the current measurement value of the RSRP of the terminal, the worse the terminal capability or the current actual transmission performance; otherwise, the better the terminal capability or the current actual transmission performance. That is, in a possible implementation manner of some embodiments of the disclosure, the foregoing step 502 may include the following.

In response to the current measurement value of the RSRP being less than a first threshold, it is determined that a first MCS table is used by the terminal for all or part of channels during the random access procedure.

Or, in response to the current measurement value of the RSRP being greater than or equal to the first threshold, it is determined that a second MCS table is used by the terminal for all or part of channels during the random access procedure; in which at least one same MCS index corresponds to a less spectral efficiency in the first MCS table than in the second MCS table.

In some embodiments of the disclosure, in response to the current measurement value of the RSRP being less than the first threshold, it can be determined that the terminal capability or the current actual transmission performance is poor, so that it can be determined that the terminal uses the first MCS table with the lower spectral efficiency for all or part of channels during the random access procedure; and in response to the current measurement value of the RSRP being greater than or equal to the first threshold, it can be determined that the terminal capability or the current actual transmission performance is better, so that it can be determined that the terminal uses the second MCS table with the higher spectral efficiency for all or part of channels during the random access procedure.

It should be noted that, in some embodiments of the disclosure, it may be limited at the same time that in response to the current measurement value of the RSRP being less than the first threshold, the terminal uses the first MCS table for all or part of channels during the random access procedure, and in response to the current measurement value of the RSRP being greater than or equal to the first threshold, the terminal uses the second MCS table for all or part of channels during the random access procedure.

Alternatively, it is also possible to only limit that in response to the current measurement value of the RSRP being less than the first threshold, the terminal uses the first MCS table for all or part of channels during the random access procedure, while in response to the current measurement value of the RSRP being greater than or equal to the first threshold, the MCS table used is not limited. For example, in response to the current measurement value of RSRP being greater than or equal to the first threshold, the first MCS table or the second MCS table may be randomly used during the random access procedure.

Alternatively, it is also possible to only limit that in response to the current measurement value of the RSRP being greater than or equal to the first threshold, the terminal uses the second MCS table for all or part of channels during the random access procedure, while in response to the current measurement value of the RSRP being less than the first threshold, the MCS table used is not limited. For example, in response to the current measurement value of the RSRP being less than the first threshold, the first MCS table or the second MCS table may be randomly used during the random access procedure.

As a possible implementation manner, when the terminal determines the MCS table used by the terminal for all or part of channels during the random access procedure according to the current measurement value of the RSRP, the terminal may synchronize the current measurement value of the RSRP through the first random access message to the base station. After synchronizing to the base station, it is determined according to the broadcast indication message or the channel indication message from the base station, which is not limited in some embodiments of the disclosure.

The method for configuring an MCS provided in some embodiments of the disclosure determines the current measurement value of the RSRP corresponding to the terminal, and determines the MCS table used by the terminal for all or part of channels during the random access procedure according to the current measurement value of the RSRP. Therefore, according to the real-time measurement value of the RSRP corresponding to the terminal, the MCS table used for each channel during the random access procedure of the terminal is determined in real time, so that the MCS table can also be configured according to the requirements during the random access procedure, thereby realizing the coverage enhancement during the random access procedure and further improves the reliability of data transmission during the random access procedure.

FIG. 6 is a flowchart of another method for configuring an MCS, according to some embodiments of the disclosure, which is applicable to a network device side, such as a base station.

As illustrated in FIG. 6, the method for configuring an MCS includes the following step.

Step 601, an MCS table used by a terminal for all or part of channels during a random access procedure, is determined based on a designated scheme, in which the designated scheme includes any one of: a scheme based on a terminal capability, a scheme based on an indication message and a preconfigured rule.

It should be noted that, the method for configuring an MCS in some embodiments of the disclosure can be applicable to any terminal. A terminal may be a device that provides voice and/or data connectivity to a user. The terminal can communicate with one or more core networks via a radio access network (RAN). The terminal can be an IoT terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal may also be a device of an unmanned aircraft. Alternatively, the terminal may also be a vehicle-mounted device, for example, a trip computer having a wireless communication function or a wireless communication device connected to the trip computer. Alternatively, the terminal may also be a roadside device, for example, a street lamp, a signal lamp or other roadside device having the wireless communication function.

The channels during the random access procedure may include a channel for transmitting a first random access message (Msg.1), a channel for transmitting a second random access message (Msg.2), a channel for transmitting a third random access message (Msg.3), a channel for transmitting a fourth random access message (Msg.4), and the like.

It should be noted that, because during the random access procedure of the terminal, each channel for data transmission between the terminal and the base station will also experience the coverage loss, so it is also possible to configure the MCS table used for each channel during the random access procedure. In this way, the coverage enhancement is performed to improve the data transmission quality during the random access procedure. However, the configuration of the MCS table is completed by the RRC and the RRC connection has not been established during the random access procedure of the terminal, so the configuration of the MCS table during the random access procedure may not be implemented through the RRC. Therefore, in some embodiments of the disclosure, during the random access procedure of the terminal, the configuration scheme of the MCS table can be reset, so as to realize the MSC table used for each channel during the random access procedure.

In all the embodiments of the disclosure, for the terminal that needs the coverage enhancement, there are two available MCS tables. One of MCS tables, for example, can be used to cover situations with better terminal capabilities or other appropriate situations, and the other of MCS tables, for example, can be used to cover situations with poor terminal capabilities or situations with higher transmission requirements (such as higher bit error rate requirements) or other appropriate situations. In all the embodiments of the disclosure, at least one same MCS index corresponds to a less spectral efficiency in the first MCS table than in the second MCS table. For example, the two MCS tables may be the first MCS table in Table 1 and the second MCS table in Table 2.

As a possible implementation manner, since the applicable scenarios of the two MCS tables are related to the terminal capability, during the random access procedure of the terminal, the base station can configure the MCS table suitable for the terminal capability according to the terminal capability, and according to the current communication process of the terminal and the base station, the determined MCS table is used for the corresponding channel.

As another possible implementation manner, the MCS table used for each channel may also be set by the base station. Therefore, the base station may transmit an indication message to the terminal to notify the terminal of the MCS table used during the random access procedure.

As another possible implementation manner, the base station may also preconfigure a rule for determining the MCS table, so that during the random access procedure of the terminal, the MCS table used for each channel may be determined according to the preconfigured rule. For example, the preconfigured rule may be a mapping relationship between channels and MCS tables during the random access procedure, which is not limited in some embodiments of the disclosure.

In some embodiments of the disclosure, step 601 may be implemented in any one of embodiments of the disclosure, which is not limited in embodiments of the disclosure, and will not be described again.

The method for configuring an MCS, provided in some embodiments of the disclosure, determines the MCS table used by the terminal for all or part of channels during the random access procedure based on the designated scheme; in which the designated scheme includes any one of: the scheme based on the terminal capability, the scheme based on the indication message and the preconfigured rule. Therefore, by presetting the designated scheme for configuring the MCS table during the random access procedure of the terminal, the MCS table can also be configured according to requirements during the random access procedure, thereby realizing the coverage enhancement during the random access procedure.

In a possible implementation of the disclosure, the MCS table matching the terminal capability may be used during the random access procedure of the terminal, so as to improve the reliability of data transmission during the random access procedure.

The following further describes still another method for configuring an MCS provided in some embodiments of the disclosure, with reference to FIG. 7.

FIG. 7 is a flowchart of still another method for configuring an MCS, according to some embodiments of the disclosure, which is applicable to a network side, such as a base station.

As illustrated in FIG. 7, the method for configuring an MCS includes the following steps.

Step 701, in response to a first random access message from the terminal, an identifier of a PRACH resource in the first random access message is determined.

Step 702, the terminal capability is determined based on the identifier of the PRACH resource in the first random access message.

As a possible implementation manner, since the applicable scenarios of the two MCS tables are related to the terminal capability, the designated scheme may be the scheme based on the terminal capability. Therefore, during the random access procedure of the terminal, the MCS table suitable to the terminal capability can be determined according to the terminal capability. The determined MCS table can be used for the corresponding channel according to the current communication process between the terminal and the base station.

As a possible implementation manner, since the terminal will transmit the first random access message to the base station during the random access procedure, the terminal may determine the identifier of the PRACH resource in the first random access message according to the terminal capability when transmitting the first random access message to the base station, to indicate whether the terminal is the first-capability terminal or the second-capability terminal by using the identifier of the PRACH resource in the first random access message. Therefore, after obtaining the first random access message, the base station can determine the terminal capability according to the identifier of the PRACH resource in the first access message.

In some embodiments of the disclosure, after obtaining the first random access message, the base station may determine the terminal capability according to the identifier of the PRACH resource in the first access message, and in response to determining that the terminal is the first-capability, determine that the first MCS table is used when the second random access message, the third random access message and the fourth random access message are transmitted during the random access procedure; and in response to the terminal being the second-capability terminal, determine that the second MCS table is used when the second random access message, the third random access message and the fourth random access message are transmitted during the random access procedure.

Step 703, in response to the terminal being a first-capability terminal, it is determined that a first MCS table is used by the terminal for all or part of channels during the random access procedure.

The first-capability terminal may be a terminal with a lower user capability; and relatively speaking, a user capability of the first-capability terminal may be lower than a user capability of the second-capability terminal. The user capability may include any one of: a number of reception antennas and a reception bandwidth. For example, the first-capability terminal may be a redcap terminal applicable in the 5G NR mode and the second-capability terminal may be an ordinary terminal applicable in LTE or 5G or any generation of communication systems, which are not limited in some embodiments.

In some embodiments of the disclosure, since the user capability of the first-capability terminal is insufficient, in response to the terminal being the first-capability terminal, the base station may determine that the first MCS table with a lower spectral efficiency may be used during the random access procedure, for example, it may be the first MCS table in Table 1.

Step 704, in response to the terminal being a second-capability terminal, it is determined that a second MCS table is used by the terminal for all or part of channels during the random access procedure, in which a spectral efficiency corresponding to at least one same MCS index in the first MCS table is smaller than that in the second MCS table.

In some embodiments of the disclosure, since the user capability of the second-capability terminal is better, in response to the terminal being the second-capability terminal, the base station may determine that the second MCS table with a higher spectral efficiency may be used during the random access procedure. For example, it may be the second MCS table in Table 2.

It should be noted that, in some embodiments of the disclosure, the base station may simultaneously limit the first-capability terminal to use the first MCS table for all or part of channels during the random access procedure and the second-capability terminal to use the second MCS table for all or part of channels during the random access procedure.

Alternatively, the base station may also only limit the first-capability terminal to use the first MCS table for all or part of channels during the random access procedure, but does not limit the MCS table used by the second-capability terminal. For example, in response to the terminal being the second-capability terminal, the first MCS table or the second MCS table may be randomly used during the random access procedure.

Alternatively, the base station may also only limit the second-capability terminal to use the second MCS table for all or part of channels during the random access procedure, but does not limit the MCS table used by the first-capability terminal. For example, in response to the terminal being the first-capability terminal, the first MCS table or the second MCS table may be randomly used during the random access procedure.

In the method for configuring an MCS provided in some embodiments of the disclosure, in response to the terminal being the first-capability terminal, it is determined that the terminal uses the first MCS table for all or part of channels during the random access procedure, or in response to the terminal being the second-capability terminal, it is determined that the terminal uses the second MCS table for all or part of channels during the random access procedure. In all the embodiments of the disclosure, at least one same MCS index corresponds to a less spectral efficiency in the first MCS table than in the second MCS table. Therefore, by configuring the MCS table matching the terminal capability during the random access procedure according to the terminal capability, the MCS table can also be configured according to the requirements during the random access procedure, thereby realizing the coverage enhancement of the random access procedure and further improving the reliability of data transmission during the random access procedure.

In a possible implementation of the disclosure, the base station may also notify the terminal of the MCS table used for each channel during the random access procedure in the form of broadcasting.

The following further describes yet another method for configuring an MCS provided in some embodiments of the disclosure, with reference to FIG. 8.

FIG. 8 is a flowchart of yet another method for configuring an MCS, according to some embodiments of the disclosure, which is applicable to a network side, such as a base station.

As illustrated in FIG. 8, the method for configuring an MCS includes the following step.

Step 801, in response to determining the MCS table used by the terminal for all or part of channels during the random access procedure, a broadcast indication message is transmitted.

As another possible implementation manner, the MCS table used for each channel can be set by the base station. Therefore, the base station can notify the terminal of the MCS table used for all or part of channels during the random access procedure by broadcasting, that is, the indication message can be a broadcast indication message.

As an example, the base station may transmit the broadcast indication message to the terminal through a broadcast channel when it needs to notify the terminal of the MCS table used for all or part of channels during the random access procedure. Therefore, in response to detecting the broadcast indication message from the base station, the terminal can determine the MCS table used by the terminal for all or part of channels during the random access procedure according to the indication of the broadcast indication message; and in response to not detecting the broadcast indication message from the base station, the first MCS table or the second MCS table may be used by default according to settings.

In a possible implementation of some embodiments of the disclosure, the broadcast indication message is used to indicate at least one of: a correspondence between capability terminals and MCS tables, a correspondence between channels and MCS tables and a correspondence between capability terminals in different channels and MCS tables.

Optionally, when the broadcast indication message can be used to indicate the correspondence between capability terminals and MCS tables, the base station can determine the MCS tables used by the capability terminals during the random access procedure according to its own scheme, and carry the correspondence between capability terminals and MCS tables in the broadcast indication message and transmit it to the terminal. For example, the correspondence between various capability terminals and MCS tables included in the broadcast indication message may be: the first-capability terminal corresponding to the first MCS table and the second-capability terminal corresponding to the second MCS table.

Optionally, when the broadcast indication message can also be used to indicate the correspondence between channels and MCS tables, since different types of channels may have different transmission rates, delay characteristics, etc., the base station may also configure the MCS table matching each channel according to the channel characteristics, and carry the correspondence between channels and MCS tables in the broadcast indication message and transmit it to the terminal to ensure the transmission rate and reliability of data for each channel. For example, the correspondence between channels and MCS tables included in the broadcast indication message may be: the MCS table corresponding to the second random access message and the third random access message being the second MCS table and the MCS table corresponding to the fourth random access message being the first MCS table.

Optionally, the base station may also determine MCS tables used by different capability terminals in different channels according to terminal capabilities and channel characteristics at the same time. That is, the broadcast indication message can be used to indicate the correspondence between capability terminals in different channels and MCS tables. In some embodiments of the disclosure, since the applicable scenarios of the two MCS tables can be related to both the terminal capabilities and channel characteristics, the terminal capabilities and channel types can be comprehensively considered to determine the MCS tables used by different terminals in different channels to further improve the rate and reliability of data transmission. Therefore, the base station can configure the MCS tables that match various capability terminals for each channel according to the terminal capabilities and the channel characteristics, and carry the correspondence between various capability terminals in different channels and MCS tables in the broadcast instruction message and transmit it to the terminal to further improve the rate and reliability of data transmission of various capability terminals for each channel. For example, the correspondence between capability terminals in different channels and MCS tables included in the broadcast indication message may be as illustrated in Table 3.

As another example, when the base station does not need to notify the terminal of the MCS table used for all or part of channels during the random access procedure, it may transmit the broadcast indication message to the terminal through the broadcast channel to indicate that the terminal does not need to determine the MCS table used for the channel during the random access procedure currently; and when it is determined that the terminal needs to be notified of the MCS table used for all or part of channels during the random access procedure, no broadcast indication information is transmitted. Thus, the base station may not transmit the broadcast message in response to determining the MCS table used by the terminal for all or part of channels during the random access procedure. That is, the terminal can determine that it needs to determine the MCS table used for each channel during the random access procedure currently in response to not detecting the broadcast indication message, and determine the MCS table used for each channel during the random access procedure according to a preset rule; and in response to detecting the broadcast indication message from the base station, the first MCS table or the second MCS table may be used by default according to the settings.

In some embodiments of the disclosure, step 801 may be implemented in any one of embodiments of the disclosure, which is not limited in embodiments of the disclosure, and will not be described again.

In the method for configuring an MCS provided in some embodiments of the disclosure, in response to determining the MCS table used by the terminal for all or part of channels during the random access procedure, the broadcast indication message is transmitted or in response to determining the MCS table used by the terminal for all or part of channels during the random access procedure, no broadcast message is transmitted. Therefore, by determining the MCS table used for each channel of the terminal during the random access procedure based on the broadcast instruction message of the base station, the MCS table can also be configured based on the requirements during the random access procedure, thereby realizing the coverage enhancement of the random access procedure and further improving the reliability of data transmission during the random access procedure.

In a possible implementation of the disclosure, the base station may also notify the terminal of the MCS table used for each channel during the random access procedure through scheduling information during the random access procedure.

Yet another method for configuring an MCS provided in some embodiments of the disclosure is further described below, with reference to FIG. 9.

FIG. 9 is a flowchart of yet another method for configuring an MCS, according to some embodiments of the disclosure which is applicable to a network device side, such as a base station.

As illustrated in FIG. 9, the method for configuring an MCS includes the following step.

Step 901, an MCS table used by a terminal for all or part of channels during a random access procedure, is determined based on a designated scheme, in which the designated scheme is based on a channel indication message during the random access procedure.

As a possible implementation, the base station may indicate the MCS table used for each channel in the second random access message and/or the fourth random access message when transmitting the second random access message and/or the fourth random access message to the terminal.

Optionally, the base station may carry indication information for indicating an MCS table used in the second random access message in a PDCCH of the second random access message. That is, in a possible implementation of some embodiments of the disclosure, the foregoing step 901 may include the following.

An MCS table used in a second random access message is carried in a PDCCH of the second random access message transmitted.

In some embodiments of the disclosure, when transmitting the second random access message to the terminal during the random access procedure, the base station, according to its own scheme, may carry only the indication information for indicating the MCS table used in the second random access message, in the PDCCH of the second random access message, so that when the terminal obtains the second random access message from the base station, it can obtain the MCS table used in the second random access message from the indication information carried in the PDCCH of the second random access message.

Optionally, the base station may further carry indication information for indicating an MCS table used in at least one of the second random access message, the third random access message and the fourth random access message in the PDCCH of the second random access message. That is, in a possible implementation of some embodiments of the disclosure, the above step 901 may include the following.

An MCS table used in a second random access message and/or a third random access message and/or a fourth random access message is carried in a PDCCH of the second random access message transmitted.

In some embodiments of the disclosure, when transmitting the second random access message to the terminal during the random access procedure, the base station may carry, the indication information for indicating the MCS table used in at least one of the second random access message, the third random access message and the third random access message, in the PDCCH of the second random access message, so that when the terminal obtains the second random access message from the base station, it can obtain the MCS table used in the second random access message, the third random access message and the fourth random access message from the indication information carried in the PDCCH of the second random access message.

Optionally, the base station may further carry indication information for indicating an MCS table used in at least one of the third random access message and the fourth random access message in the PDCCH of the second random access message. That is, in a possible implementation of some embodiments of the disclosure, the above step 901 may include the following.

An MCS table used in a third random access message and/or a fourth random access message is carried in a PDCCH of the second random access message transmitted.

In some embodiments of the disclosure, when transmitting the second random access message to the terminal during the random access procedure, the base station may carry, the indication information for indicating the MCS table used in at least one of the third random access message and the third random access message, in the PDCCH of the second random access message, so that when the terminal obtains the second random access message from the base station, it obtains the MCS table used in the third random access message and the fourth random access message from the indication information carried in the PDCCH of the second random access message.

Optionally, the base station may further carry indication information for indicating an MCS table used in the fourth random access message in a PDCCH of the fourth random access message. That is, in a possible implementation of some embodiments of the disclosure, the foregoing step 901 may include the following.

An MCS table used in a fourth random access message is carried in a PDCCH of the fourth random access message transmitted.

In some embodiments of the disclosure, the base station may carry the MCS table used in the fourth random access message when transmitting the fourth random access message to the terminal during the random access procedure, so that when the terminal obtains the fourth random access message from the base station, the terminal can obtain the MCS table used in the fourth random access message from the indication information carried in the PDCCH of the fourth random access message.

In some embodiments of the disclosure, step 901 may be implemented in any one of embodiments of the disclosure, which is not limited in embodiments of the disclosure, and will not be described again.

In the method for configuring an MCS provided in some embodiments of the disclosure, the MCS table used by the terminal for all or part of channels during the random access procedure, is determined based on the designated scheme, in which the designated scheme is based on the channel indication message during the random access procedure. Therefore, the MCS table used for each channel of the terminal during the random access procedure is determined according to the channel indication message from the base station during the random access procedure, so that the MCS table can also be configured according to the requirements during the random access procedure. The coverage enhancement during the random access procedure is realized and the reliability of data transmission during the random access procedure is further improved.

In a possible implementation of the disclosure, the base station may also determine the MCS table used by the terminal for each channel during the random access procedure, according to a preset rule, for example, according to a current measurement value of a RSRP of the terminal.

Another method for configuring an MCS provided in some embodiments of the disclosure is further described below, with reference to FIG. 10.

FIG. 10 is a flowchart of another method for configuring an MCS, according to some embodiments of the disclosure, which is applicable to a network side, such as a base station.

As illustrated in FIG. 10, the method for configuring an MCS includes the following steps.

Step 1001, in response to obtaining an identifier of a PRACH resource in a first random access message, a current measurement value of a RSRP corresponding to the terminal currently is determined.

As a possible implementation manner, a rule for determining the MCS table may also be preconfigured, so that during the random access procedure of the terminal, the MCS table used for each channel may be determined according to the preconfigured rule. For example, the preconfigured rule may be to determine the MCS table used by the terminal for all or part of channels during the random access procedure according to the current measurement value of the RSRP In some embodiments of the disclosure, since the current measurement value of the RSRP of the terminal can reflect the current user capability and the current actual transmission performance of the terminal. Therefore, the MCS table used for each channel during the random access procedure can be determined according to the current measurement value of the RSRP, to satisfy the current real-time performance requirements of the terminal. Therefore, the terminal can measure the RSRP during the random access procedure, so as to determine the MCS table used for each channel during the random access procedure according to the range of the current RSRP measurement value.

In some embodiments of the disclosure, after measuring the current measurement value of the RSRP, the terminal may transmit the current measurement value of the RSRP to the base station so that the base station determines the MCS table used for each channel matching the current measurement value of the RSRP. In detail, since the terminal will transmit the first random access message to the base station during the random access procedure, the terminal may, when transmitting the first random access message to the base station, determine the identifier of the PRACH resource in the first random access message according to the current measurement value of the RSRP. The identifier of the PRACH resource in the first random access message is configured to indicate the current measurement value of the RSRP. Therefore, after obtaining the first random access message, the base station can determine the current measurement value of the RSRP according to the identifier of the PRACH resource in the first access message, so as to determine the MCS table for each channel during the random access procedure according to the current measurement value of the RSRP.

In some embodiments of the disclosure, step 1001 may be implemented in any one of embodiments of the disclosure, which is not limited in embodiments of the closure, and will not be described again.

Step 1002, in response to the current measurement value of the RSRP being less than a first threshold, it is determined that a first MCS table is used by the terminal for all or part of channels during the random access procedure.

Step 1003, in response to the current measurement value of the RSRP being greater than or equal to the first threshold, it is determined that a second MCS table is used by the terminal for all or part of channels during the random access procedure; in which at least one same MCS index corresponds to a less spectral efficiency in the first MCS table than in the second MCS table.

In some embodiments of the disclosure, the current measurement value of the RSRP of the terminal may reflect the current actual transmission performance of the terminal. In detail, the smaller the current measurement value of the RSRP of the terminal, the worse the terminal capability or the current actual transmission performance; otherwise, the better the terminal capability or the current actual transmission performance. Therefore, in response to the current measurement value of the RSRP being less than the first threshold, it can be determined that the terminal capability or the current actual transmission performance is poor, so that it can be determined that the terminal uses the first MCS table with the lower spectral efficiency for all or part of channels during the random access procedure; and in response to the current measurement value of the RSRP being greater than or equal to the first threshold, it can be determined that the terminal capability or the current actual transmission performance is better, so that it can be determined that the terminal uses the second MCS table with the higher spectral efficiency for all or part of channels during the random access procedure.

It should be noted that, in some embodiments of the disclosure, the base station may simultaneously limit that in response to the current measurement value of the RSRP being less than the first threshold, the terminal uses the first MCS table for all or part of channels during the random access procedure, and in response to the current measurement value of the RSRP being greater than or equal to the first threshold, the terminal uses the second MCS table for all or part of channels during the random access procedure.

Alternatively, the base station may only limit that in response to the current measurement value of the RSRP being less than the first threshold, the terminal uses the first MCS table for all or part of channels during the random access procedure, and in response to the current measurement value of the RSRP being greater than or equal to the first threshold, the MCS table used is not limited. For example, in response to the current measurement value of the RSRP being greater than or equal to the first threshold, the first MCS table or the second MCS table may be randomly used during the random access procedure.

Alternatively, the base station may only limit that in response to the current measurement value of the RSRP being greater than or equal to the first threshold, the terminal uses the second MCS table for all or part of channels during the random access procedure, and in response to the current measurement value of the RSRP being less than the first threshold, the MCS table used is not limited. For example, in response to the current measurement value of the RSRP being less than the first threshold, the first MCS table or the second MCS table may be randomly used during the random access procedure.

As a possible implementation manner, when the base station determines the MCS table used by terminal for all or part of channels during the random access procedure according to the current measurement value of the RSRP, the base station may transmit it to the terminal through a broadcast indication message or a channel indication message after determining the MCS table used for all or part of channels during the random access procedure.

In the method for configuring an MCS provided in some embodiments of the disclosure, the current measurement value of the RSRP corresponding to the terminal is determined by using the identifier of the PRACH resource in the obtained first random access message, and in response to the current measurement value of the RSRP being less than the first threshold, it is determined that the terminal uses the first MCS table for all or part of channels during the random access procedure, or in response to the current measurement value of the RSRP being greater than or equal to the first threshold, it is determined that the terminal uses the second MCS table for all or part of channels during the random access procedure. In all embodiments of the disclosure, at least one same MCS index corresponds to a less spectral efficiency in the first MCS table than in the second MCS table. Therefore, according to the real-time measurement value of the RSRP corresponding to the terminal, the MCS table used for each channel during the random access procedure of the terminal is determined in real time, so that the MCS table can also be configured according to the requirements during the random access procedure, thereby realizing the coverage enhancement during the random access procedure and further improves the reliability of data transmission during the random access procedure.

In order to realize the above embodiments, the disclosure also proposes an apparatus for configuring an MCS.

FIG. 11 is a block diagram of an apparatus for configuring an MCS, according to some embodiments of the disclosure, which is applicable to a terminal.

As illustrated in FIG. 11, the apparatus 1100 for configuring an MCS includes a first determining module 1101.

The first determining module 1101 is configured to determine an MCS table used by a terminal for all or part of channels during a random access procedure based on a designated scheme; in which the designated scheme includes any one of: a scheme based on a terminal capability, a scheme based on an indication message and a preconfigured rule.

In actual use, the apparatus for configuring an MCS provided in some embodiments of the disclosure may be configured in any communication device to execute the foregoing method for configuring an MCS.

The apparatus for configuring an MCS, provided in some embodiments of the disclosure, determines the MCS table used by the terminal for all or part of channels during the random access procedure based on the designated scheme; in which the designated scheme includes any one of: the scheme based on the terminal capability, the scheme based on the indication message and the preconfigured rule. Therefore, by presetting the designated scheme for configuring the MCS table during the random access procedure of the terminal, the MCS table can also be configured according to requirements during the random access procedure, thereby realizing the coverage enhancement during the random access procedure.

In a possible implementation of the disclosure, the above-mentioned designated scheme includes the scheme based on the terminal capability; correspondingly, the above-mentioned first determining module 1101 includes a first determining unit or a second determining unit.

The first determining unit is configured to, in response to the terminal being a first-capability terminal, determine that a first MCS table is used by the terminal for all or part of channels during the random access procedure.

The second determining unit is configured to, in response to the terminal being a second-capability terminal, determine that a second MCS table is used by the terminal for all or part of channels during the random access procedure; in which at least one same MCS index corresponds to a less spectral efficiency in the first MCS table than in the second MCS table.

Further, in another possible implementation of the disclosure, a user capability of the first-capability terminal is lower than a user capability of the second-capability terminal, and the user capability includes any one of: a number of reception antennas and a reception bandwidth.

Further, in still another possible implementation of the disclosure, the apparatus 1100 for configuring an MCS configuration further includes a third determining module or a fourth determining module.

The third determining module is configured to determine an identifier of a PRACH resource in a first random access message transmitted to a base station, based on the terminal capability.

The fourth determining module is configured to determine indication information in UL grant in a third random access message transmitted to the base station, based on the terminal capability.

Further, in yet another possible implementation of the disclosure, the above-mentioned designated scheme is based on a broadcast indication message; correspondingly, the above-mentioned first determining module 1101 includes a third determining unit or a fourth determining unit.

The third determining unit is configured to, in response to detecting the broadcast indication message, determine the MCS table used by the terminal for all or part of channels during the random access procedure based on an indication of the broadcast indication message.

The fourth determining unit is configured to, in response to not detecting the broadcast indication message, determine a designated MCS table used by the terminal for all or part of channels during the random access procedure.

Further, in yet another possible implementation of the disclosure, the above-mentioned broadcast indication message is configured to indicate a correspondence between capability terminals and MCS tables, and the above-mentioned third determining unit is specifically configured to: in response to detecting the broadcast indication message, determine the terminal capability; and determine the MCS table used by the terminal for all or part of channels during the random access procedure based on the correspondence between capability terminals and MCS tables, indicated by the broadcast indication message, and the terminal capability.

Further, in yet another possible implementation of the disclosure, the above-mentioned broadcast indication message is configured to indicate a correspondence between channels and MCS tables, and in response to detecting the broadcast indication message, and the above-mentioned third determining unit is specifically configured to: in response to detecting the broadcast indication message, determine the MCS table used by the terminal for all or part of channels during the random access procedure based on the correspondence between channels and MCS tables, indicated by the broadcast indication message.

Further, in yet another possible implementation of the disclosure, the above-mentioned broadcast indication message is configured to indicate a correspondence between capability terminals in different channels and MCS tables, and in response to detecting the broadcast indication message, and the above-mentioned third determining unit is specifically configured to: in response to detecting the broadcast indication message, determine the terminal capability; and determine the MCS table used by the terminal for all or part of channels during the random access procedure based on the correspondence between capability terminals in different channels and MCS tables, indicated by the broadcast indication message, and the terminal capability.

Further, in yet another possible implementation of the disclosure, the above-mentioned designated scheme is based on a channel indication message during the random access procedure, and the above-mentioned first determining module 1101 includes a fifth determining unit, a sixth determining unit, seventh determining unit or an eighth determining unit.

The fifth determining unit is configured to, in response to obtaining indication information carried in a PDCCH of a second random access message from a base station, determine an MCS table used in the second random access message.

The sixth determining unit is configured to, in response to obtaining indication information carried in a PDCCH of a second random access message from a base station, determine an MCS table used in the second random access message and/or a third random access message and/or a fourth random access message.

The seventh determining unit is configured to, in response to obtaining indication information carried in a PDCCH of a second random access message from a base station, determine an MCS table used in a third random access message and/or a fourth random access message.

The eighth determining unit is configured to, in response to obtaining indication information carried in a PDCCH of a fourth random access message from a base station, determine an MCS table used in the fourth random access message Further, in yet another possible implementation of the disclosure, the above-mentioned designated scheme is based on the preconfigured rule, and the above-mentioned first determining module 1101 includes a ninth determining unit and a tenth determining unit.

The ninth determining unit is configured to determine a current measurement value of a reference signal receiving power (RSRP) corresponding to the terminal currently.

The tenth determining unit is configured to determine the MCS table used by the terminal for all or part of channels during the random access procedure based on the current measurement value of the RSRP.

Further, in another possible implementation of the disclosure, the above-mentioned tenth determining unit is specifically configured to: in response to the current measurement value of the RSRP being less than a first threshold, determine that a first MCS table is used by the terminal for all or part of channels during the random access procedure; or in response to the current measurement value of the RSRP being greater than or equal to the first threshold, determine that a second MCS table is used by the terminal for all or part of channels during the random access procedure; in which at least one same MCS index corresponds to a less spectral efficiency in the first MCS table than in the second MCS table.

Further, in yet another possible implementation of the disclosure, the apparatus 1100 for configuring an MCS further includes a fifth determining module.

The fifth determining module is configured to determine determining an identifier of a PRACH resource in a first random access message transmitted to a base station, based on the current measurement value of the RSRP, in which the identifier of the PRACH resource is configured to represent the MCS table used by the terminal for all or part of channels during the random access procedure.

It should be noted that the foregoing explanations of the embodiments of the method for configuring an MCS in FIG. 1, FIG. 2, FIG. 3, FIG. 4 and FIG. 5 also are applicable to the apparatus 1100 for configuring an MCS in the embodiments of the disclosure, which will not be repeated herein.

In the apparatus for configuring an MCS provided in some embodiments of the disclosure, in response to the terminal being the first-capability terminal, it is determined that the terminal uses the first MCS table for all or part of channels during the random access procedure, or in response to the terminal being the second-capability terminal, it is determined that the terminal uses the second MCS table for all or part of channels during the random access procedure. In all the embodiments of the disclosure, at least one same MCS index corresponds to a less spectral efficiency in the first MCS table than in the second MCS table. Therefore, by configuring the MCS table matching the terminal capability during the random access procedure according to the terminal capability, the MCS table can also be configured according to the requirements during the random access procedure, thereby realizing the coverage enhancement of the random access procedure and further improving the reliability of data transmission during the random access procedure.

In order to realize the above embodiments, the disclosure also proposes an apparatus for configuring an MCS.

Figure 12:
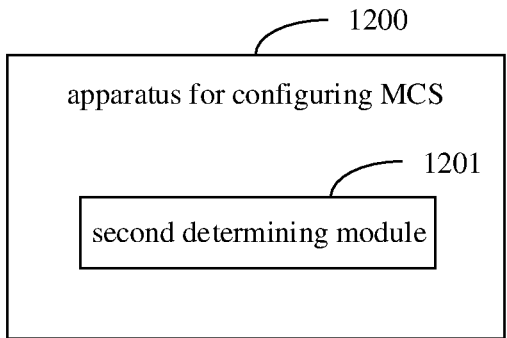
FIG. 12 is a block diagram of another apparatus for configuring an MCS, according to some embodiments of the disclosure.

FIG. 12 is a block diagram of another apparatus for configuring an MCS, according to some embodiments of the disclosure, which is applicable to a base station.

As illustrated in FIG. 12, the apparatus 1200 for configuring an MCS includes a second determining module 1201.

The second determining module 1201 is configured to determine an MCS table used by a terminal for all or part of channels during a random access procedure, based on a designated scheme; in which the designated scheme includes any one of: a scheme based on a terminal capability, a scheme based on an indication message and a preconfigured rule.

In actual use, the apparatus for configuring an MCS provided in some embodiments of the disclosure may be configured in any communication device to execute the foregoing method for configuring an MCS.

The apparatus for configuring an MCS, provided in some embodiments of the disclosure, determines the MCS table used by the terminal for all or part of channels during the random access procedure based on the designated scheme; in which the designated scheme includes any one of: the scheme based on the terminal capability, the scheme based on the indication message and the preconfigured rule. Therefore, by presetting the designated scheme for configuring the MCS table during the random access procedure of the terminal, the MCS table can also be configured according to requirements during the random access procedure, thereby realizing the coverage enhancement during the random access procedure.

In a possible implementation of the disclosure, the above-mentioned designated scheme includes the scheme based on the terminal capability, and the above-mentioned apparatus 1200 further includes a sixth determining module and a seventh determining module.

The sixth determining module is configured to, in response to a first random access message from the terminal, determine an identifier of a PRACH resource in the first random access message.

The seventh determining module is configured to determine the terminal capability based on the identifier of the PRACH resource in the first random access message.

Further, in another possible implementation of the disclosure, the above-mentioned second determining module 1201 includes an eleventh determining unit or a twelfth determining unit.

The eleventh determining unit is configured to, in response to the terminal being a first-capability terminal, determine that a first MCS table is used by the terminal for all or part of channels during the random access procedure.

The twelfth determining unit is configured to, in response to the terminal being a second-capability terminal, determine that a second MCS table is used by the terminal for all or part of channels during the random access procedure; in which at least one same MCS index corresponds to a less spectral efficiency in the first MCS table than in the second MCS table.

Further, in yet another possible implementation of the disclosure, the above-mentioned designated scheme is based on a broadcast indication message, and the above-mentioned apparatus 1200 further includes a first response module or a second response module.

The first response module is configured to, in response to determining the MCS table used by the terminal for all or part of channels during the random access procedure, transmit the broadcast indication message.

The second response module is configured to, in response to determining the MCS table used by the terminal for all or part of channels during the random access procedure, not transmit the broadcast indication message.

Further, in another possible implementation of the disclosure, the above-mentioned broadcast indication message is configured to indicate at least one of: a correspondence between capability terminals and MCS tables, a correspondence between channels and MCS tables and a correspondence between capability terminals in different channels and MCS tables.

Further, in another possible implementation of the disclosure, the above-mentioned designated scheme is based on channel indication information during the random access procedure, and the above-mentioned second determining module 1201 includes a first carrying unit, a second carrying unit, a third carrying unit or a fourth carrying unit.

The first carrying unit is configured to carry an MCS table used in a second random access message in a PDCCH of the second random access message that is transmitted.

The second carrying unit is configured to carry an MCS table used in a second random access message and/or a third random access message and/or a fourth random access message in a PDCCH of the second random access message that is transmitted.

The third carrying unit is configured to carry an MCS table used in a third random access message and/or a fourth random access message in a PDCCH of the second random access message that is transmitted.

The fourth carrying unit is configured to carry an MCS table used in a fourth random access message in a PDCCH of the fourth random access message that is transmitted.

Further, in another possible implementation of the disclosure, the above-mentioned designated scheme is the preconfigured rule, and the above-mentioned apparatus 1200 further includes an eighth determining module.

The eighth determining module is configured to, in response to obtaining an identifier of a PRACH resource in a first random access message, determine a current measurement value of an RSRP corresponding to the terminal currently.

Further, in yet another possible implementation of the disclosure, the above-mentioned second determining module 1201 includes a thirteenth determining unit or a fourteenth determining unit.

The thirteenth determining unit is configured to, in response to the current measurement value of the RSRP being less than a first threshold, determine that a first MCS table is used by the terminal for all or part of channels during the random access procedure.

The fourteenth determining unit is configured to, in response to the current measurement value of the RSRP being greater than or equal to the first threshold, determine that a second MCS table is used by the terminal for all or part of channels during the random access procedure. At least one same MCS index corresponds to a less spectral efficiency in the first MCS table than in the second MCS table.

It should be noted that the foregoing explanations of the embodiments of the method for configuring an MCS in FIG. 7, FIG. 8, FIG. 9 and FIG. 10 also are applicable to the apparatus 90 for configuring an MCS in the embodiments of the disclosure, which will not be repeated herein.

In the apparatus for configuring an MCS provided in some embodiments of the disclosure, in response to the terminal being the first-capability terminal, it is determined that the terminal uses the first MCS table for all or part of channels during the random access procedure, or in response to the terminal being the second-capability terminal, it is determined that the terminal uses the second MCS table for all or part of channels during the random access procedure. In all the embodiments of the disclosure, at least one same MCS index corresponds to a less spectral efficiency in the first MCS table than in the second MCS table. Therefore, by configuring the MCS table matching the terminal capability during the random access procedure according to the terminal capability, the MCS table can also be configured according to the requirements during the random access procedure, thereby realizing the coverage enhancement of the random access procedure and further improving the reliability of data transmission during the random access procedure.

In order to realize the above embodiments, the disclosure also proposes a communication device.

The communication device provided in some embodiments of the disclosure includes a processor, a transceiver, a memory and an executable program stored on the memory and capable of being executed by the processor, in which the processor is configured to execute the executable program to perform the method for configuring an MCS in any of the foregoing technical solutions.

The communication device may be the aforementioned base station or terminal.

The processor may include various types of storage media, which are non-transitory computer storage media that can continue to memorize and store information on the communication device after the power is turned off. Herein, the communication device includes the base station or the terminal.

The processor may be connected to the memory through a bus or the like, for reading the executable program stored on the memory, such as at least one of FIG. 1 to FIG. 10.

In order to realize the above embodiments, the disclosure also proposes a computer storage medium.

The computer storage medium provided in some embodiments of the disclosure stores an executable program; after the executable program is executed by a processor, the method for configuring an MCS in any of the foregoing technical solutions is performed, for example, at least as illustrated in FIG. 1 to FIG. 10.

Figure 13:
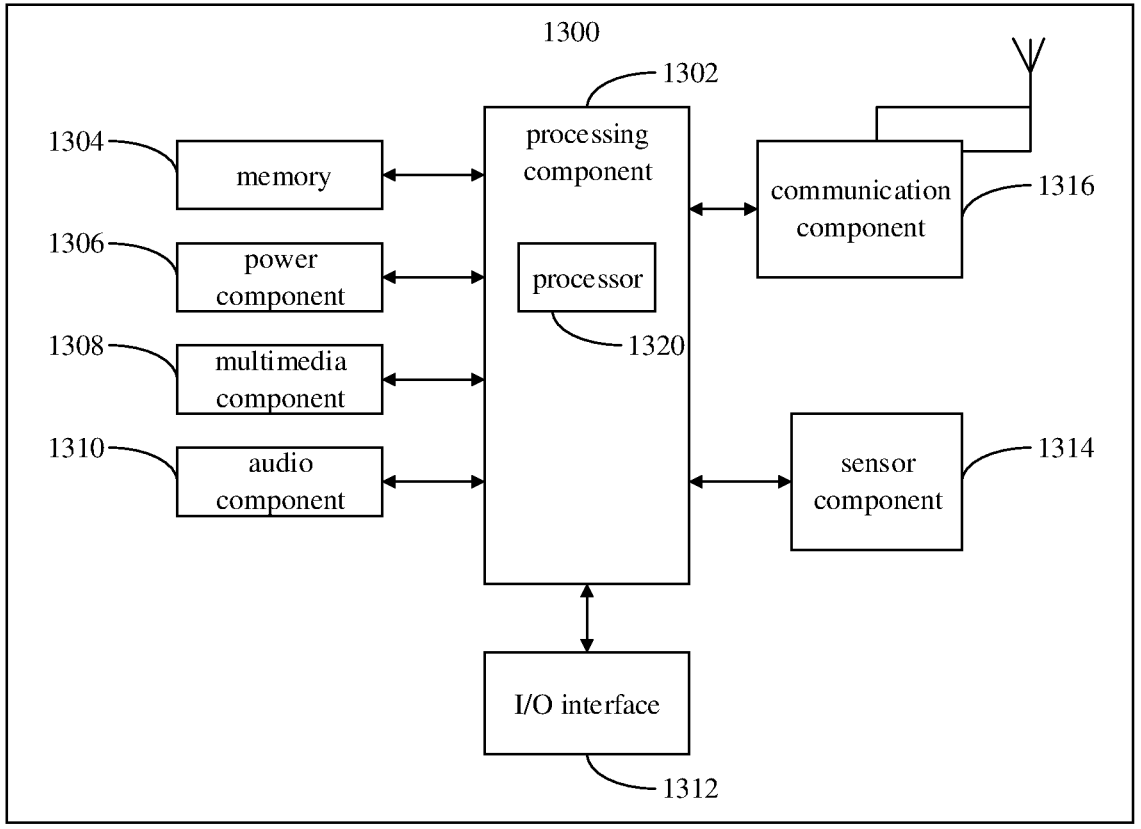
FIG. 13 is a block diagram of a user equipment (UE), according to some embodiments of the disclosure.

FIG. 13 is a block diagram of a UE 1300, according to some embodiments of the disclosure. For example, the UE 1300 may be a mobile phone, a computer, a digital broadcast terminal, a messaging device, a gaming console, a tablet, a medical device, exercise equipment, a personal digital assistant, and the like.

Referring to FIG. 13, the UE 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the UE 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the UE 1300. Examples of such data include instructions for any applications or methods operated on the UE 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the UE 1300. The power component 1306 may include a power management system, one or more power sources, and any other components associated with the generation, management, and distribution of power in the UE 1300.

The multimedia component 1308 includes a screen providing an output interface between the UE 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the UE 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the UE 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the UE 1300. For instance, the sensor component 1314 may detect an open/closed status of the UE 1300, relative positioning of components, e.g., the display and the keypad, of the UE 1300, a change in position of the UE 1300 or a component of the UE 1300, a presence or absence of user contact with the UE 1300, an orientation or an acceleration/deceleration of the UE 1300, and a change in temperature of the UE 1300. The sensor component 1314 may include a proximity sensor configured to detect the presence of nearby objects without any physical contact. The sensor component 1314 may also include a light sensor, such as a CMOS or CCD image sensor, for use in imaging disclosures. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the UE 1300 and other devices. The UE 1300 can access a wireless network based on a communication standard, such as WiFi, 2G, or 3G, or a combination thereof. In one exemplary embodiment, the communication component

1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the UE 1300 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 1304, executable by the processor 1320 in the UE 1300, for performing the above-described methods. For example, the non-transitory computer-readable storage medium may be a ROM, a RAM, a CD-ROM, a magnetic tape, a floppy disc, an optical data storage device, and the like.

Figure 14:
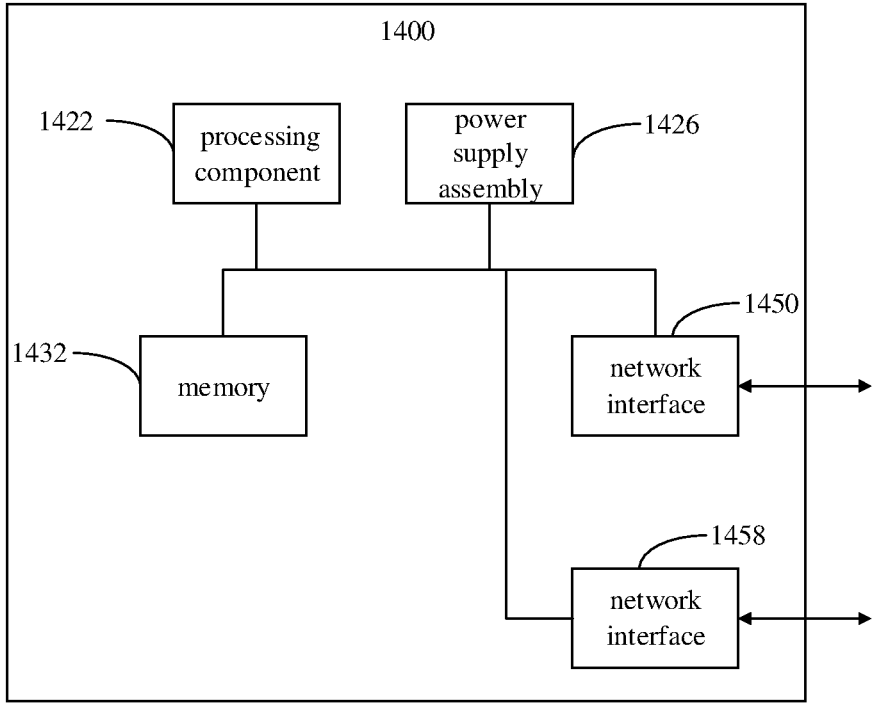
FIG. 14 is a block diagram of a base station, according to some embodiments of the disclosure.

As illustrated in FIG. 14, it is a diagram of a base station according to some embodiments of the disclosure. For example, the base station 1400 may be provided as a network device. Referring to FIG. 14, the base station 1400 includes a processing component 1422, which further includes at least one processor, and a memory resource, represented by a memory 1432, for storing instructions executable by the processing component 1422, such as an application program. The application program stored in the memory 1432 may include one or more modules, in which each corresponding to a set of instructions. Furthermore, the processing component 1422 is configured to execute instructions to perform any of the aforementioned methods applicable to the base station, e.g., the methods illustrated in FIGS. 6-10.

The base station 1400 may also include a power supply assembly 1426 configured to perform power management of the base station 1400, a wired or wireless network interface 1450 configured to connect the base station 1400 to a network, and an I/O interface 1458. The base station 1400 may operate based on an operating system stored in the memory 1432, such as Windows Server™, Mac OS X™, Unix™, Linux™, FreeBSD™ or the like.

Other embodiments of the disclosure will be apparent to those skilled in the art from consideration of the specification and practice of the disclosure disclosed herein. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for configuring a modulation and coding scheme (MCS), performed by a terminal, the method comprising:

determining an MCS table used by the terminal for part of channels during a random access procedure based on a designated scheme;

wherein the designated scheme comprises any one of: a scheme based on an indication message and a preconfigured rule;

in a case where the designated scheme comprises the preconfigured rule, determining the MCS table used by the terminal for part of channels during the random access procedure based on the designated scheme comprises:

determining a measurement value of a reference signal receiving power (RSRP) corresponding to the terminal currently; and determining the MCS table used by the terminal for part of channels during the random access procedure based on the measurement value of the RSRP.

2. The method of claim 1, wherein the designated scheme comprises the scheme based on the indication message, the indication message comprises a broadcast indication message, and determining the MCS table used by the terminal for part of channels during the random access procedure based on the designated scheme comprises:

in response to detecting the broadcast indication message, determining the MCS table used by the terminal for part of channels during the random access procedure based on an indication of the broadcast indication message; or in response to not detecting the broadcast indication message, determining a designated MCS table used by the terminal for part of channels during the random access procedure.

3. The method of claim 2, wherein the broadcast indication message is configured to indicate a correspondence between capability terminals and MCS tables, and in response to detecting the broadcast indication message, determining the MCS table used by the terminal for part of channels during the random access procedure based on the indication of the broadcast indication message comprises:

in response to detecting the broadcast indication message, determining a terminal capability; and determining the MCS table used by the terminal for part of channels during the random access procedure based on the correspondence between capability terminals and MCS tables, indicated by the broadcast indication message, and the terminal capability.

4. The method of claim 2, wherein the broadcast indication message is configured to indicate a correspondence between channels and MCS tables, and in response to detecting the broadcast indication message, determining the MCS table used by the terminal for part of channels during the random access procedure based on the indication of the broadcast indication message comprises:

in response to detecting the broadcast indication message, determining the MCS table used by the terminal for part of channels during the random access procedure based on the correspondence between channels and MCS tables, indicated by the broadcast indication message.

5. The method of claim 2, wherein the broadcast indication message is configured to indicate a correspondence between capability terminals in different channels and MCS tables, and in response to detecting the broadcast indication message, determining the MCS table used by the terminal for part of channels during the random access procedure based on the indication of the broadcast indication message comprises:

in response to detecting the broadcast indication message, determining a terminal capability; and determining the MCS table used by the terminal for part of channels during the random access procedure based on the correspondence between capability terminals in different channels and MCS tables, indicated by the broadcast indication message, and the terminal capability.

6. The method of claim 1, wherein determining the MCS table used by the terminal for part of channels during the random access procedure based on the measurement value of the RSRP comprises:

in response to the measurement value of the RSRP being less than a first threshold, determining that a first MCS table is used by the terminal for part of channels during the random access procedure; or in response to the measurement value of the RSRP being greater than or equal to the first threshold, determining that a second MCS table is used by the terminal for part of channels during the random access procedure;

wherein at least one same MCS index corresponds to a less spectral efficiency in the first MCS table than in the second MCS table.

7. A non-transitory computer-readable storage medium having stored therein instructions that, when executed by a processor of a terminal, cause the terminal to perform the method of claim 1.

8. A method for configuring a modulation and coding scheme (MCS), performed by a network device, the method comprising:

determining an MCS table used by a terminal for part of channels during a random access procedure, based on a designated scheme;

wherein the designated scheme comprises any one of: a scheme based on an indication message and a preconfigured rule;

in a case where the designated scheme comprises the preconfigured rule, determining the MCS table used by the terminal for part of channels during the random access procedure comprises:

in response to obtaining an identifier of a physical random access channel (PRACH) resource in a first random access message, determining a measurement value of a reference signal receiving power (RSRP) corresponding to the terminal currently;

determining the MCS table used by the terminal for part of channels during the random access procedure based on the measurement value of the RSRP.

9. The method of claim 8, wherein the designated scheme comprises the scheme based on the indication message, the indication message comprises a broadcast indication message, and the method further comprises:

in response to determining the MCS table used by the terminal for part of channels during the random access procedure, transmitting the broadcast indication message; or in response to determining the MCS table used by the terminal for part of channels during the random access procedure, not transmitting the broadcast indication message.

10. The method of claim 9, wherein the broadcast indication message is configured to indicate at least one of: a correspondence between capability terminals and MCS tables, a correspondence between channels and MCS tables and a correspondence between capability terminals in different channels and MCS tables.

11. The method of claim 8, wherein determining the MCS table used by the terminal for part of channels during the random access procedure based on the measurement value of the RSRP comprises:

in response to the measurement value of the RSRP being less than a first threshold, determining that a first MCS table is used by the terminal for part of channels during the random access procedure; or in response to the measurement value of the RSRP being greater than or equal to the first threshold, determining that a second MCS table is used by the terminal for part of channels during the random access procedure;

wherein at least one same MCS index corresponds to a less spectral efficiency in the first MCS table than in the second MCS table.

12. A network device, comprising:

a transceiver;

a memory; and a processor, respectively connected to the transceiver and the memory, and configured to perform the method of claim 8.

13. A terminal, comprising:

a transceiver;

a memory; and a processor, respectively connected to the transceiver and the memory, and configured to:

determine a modulation and coding scheme (MCS) table used by the terminal for part of channels during a random access procedure based on a designated scheme;

wherein the designated scheme comprises any one of: a scheme based on an indication message and a preconfigured rule;

the processor is further configured to: in a case where the designated scheme comprises the preconfigured rule, determine a measurement value of a reference signal receiving power (RSRP) corresponding to the terminal currently; and determine the MCS table used by the terminal for part of channels during the random access procedure based on the measurement value of the RSRP.

14. The terminal of claim 13, wherein the designated scheme comprises the scheme based on the indication message, the indication message comprises a broadcast indication message, and the processor is further configured to:

in response to detecting the broadcast indication message, determine the MCS table used by the terminal for part of channels during the random access procedure based on an indication of the broadcast indication message; or in response to not detecting the broadcast indication message, determine a designated MCS table used by the terminal for part of channels during the random access procedure.

15. The terminal of claim 14, wherein the broadcast indication message is configured to indicate a correspondence between capability terminals and MCS tables, and the processor is further configured to:

in response to detecting the broadcast indication message, determine a terminal capability; and determine the MCS table used by the terminal for part of channels during the random access procedure based on the correspondence between capability terminals and MCS tables, indicated by the broadcast indication message, and the terminal capability.

16. The terminal of claim 14, wherein the broadcast indication message is configured to indicate a correspondence between channels and MCS tables, and the processor is further configured to:

in response to detecting the broadcast indication message, determine the MCS table used by the terminal for part of channels during the random access procedure based on the correspondence between channels and MCS tables, indicated by the broadcast indication message.

17. The terminal of claim 14, wherein the broadcast indication message is configured to indicate a correspondence between capability terminals in different channels and MCS tables, and the processor is further configured to:

in response to detecting the broadcast indication message, determine a terminal capability; and determine the MCS table used by the terminal for part of channels during the random access procedure based on the correspondence between capability terminals in different channels and MCS tables, indicated by the broadcast indication message, and the terminal capability.

* * * * *